Oct. 20, 1964 R. G. CHESLEY 3,153,436
SPIRAL MEAT SLICER
Filed May 19, 1961 4 Sheets-Sheet 1

INVENTOR.
ROBERT G. CHESLEY
BY
WILSON, SETTLE & CRAIG
ATTORNEYS

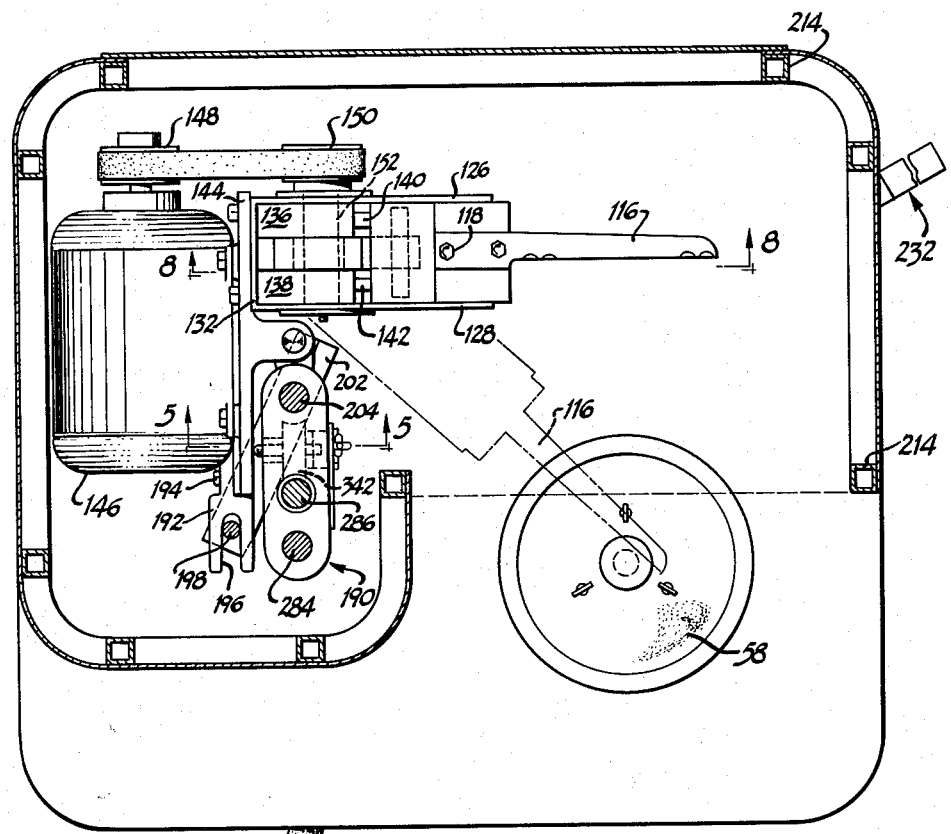
FIG. 4
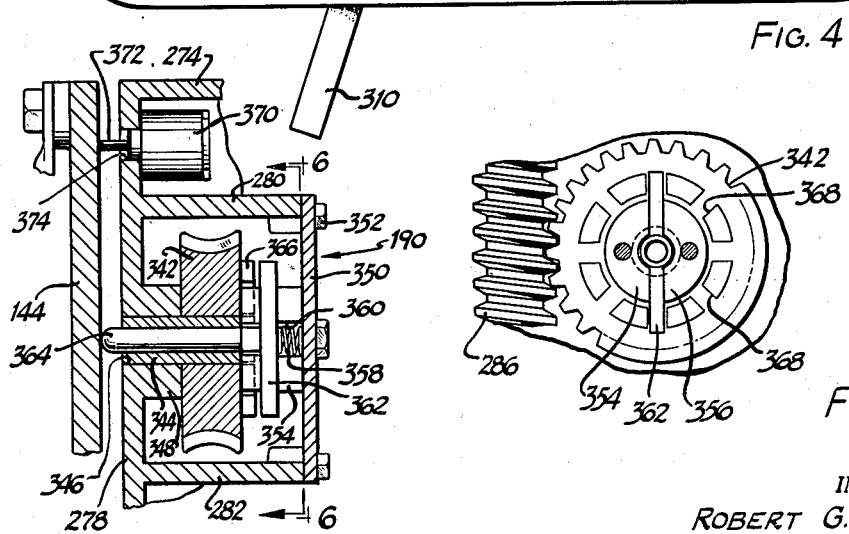
FIG. 5
FIG. 6
INVENTOR.
ROBERT G. CHESLEY
BY
WILSON, SETTLE & CRAIG
ATTORNEYS Oct. 20, 1964  R. G. CHESLEY  3,153,436
SPIRAL MEAT SLICER
Filed May 19, 1961  4 Sheets-Sheet 3

INVENTOR.
ROBERT G. CHESLEY
BY
WILSON, SETTLE & CRAIG
ATTORNEYS

Oct. 20, 1964   R. G. CHESLEY   3,153,436
SPIRAL MEAT SLICER
Filed May 19, 1961   4 Sheets-Sheet 4

INVENTOR.
ROBERT G. CHESLEY
BY
WILSON, SETTLE & CRAIG
ATTORNEYS

United States Patent Office 3,153,436
Patented Oct. 20, 1964

3,153,436
SPIRAL MEAT SLICER
Robert G. Chesley, Detroit, Mich., assignor, by mesne assignments, to Harry J. Hoenselaar, Detroit, Mich.
Filed May 19, 1961, Ser. No. 111,213
11 Claims. (Cl. 146—167)

The present invention relates to a spiral meat slicer, and more particularly to a spiral meat slicer which will form a continuous spiral slice on a piece of meat having a center bone structure which may include a crooked bone of non-uniform diameter, such as in a ham.

The slicing of joints of meat, particularly joints having odd shaped center bone structures, has long been a problem in the meat industry. In particular, difficulties have been encountered in the attempt to slice ham because of the L-shaped construction of the ham bone. The present invention provides improved apparatus for slicing such joints of meats, the apparatus being simple to operate, relatively inexpensive to manufacture and durable in use.

An object of the invention is to provide a spiral meat slicer in which the knife, rather than the meat, is moved axially during slicing, thus eliminating the necessity for a high power drive system and support structure necessary when lifting a relatively heavy cut of meat.

It is another object of the invention to provide a spiral meat slicer having means thereon for mounting different sized cuts of meat.

Another object of the invention is to provide an accessory spit for use in connection with the spiral slicing apparatus to permit slicing of cuts of meat which do not have a center bone structure.

A further object of the invention is to provide a novel reciprocating knife construction for slicing the meat which is reciprocated in the meat during the slicing operation to provide a smooth cut and prevent the meat sticking to the knife blade.

A still further object of the invention is to provide a slicer which is substantially automatic in operation.

Another object is to provide means to automatically actuate the slicer to rotate the meat and raise the knife upon manual actuation of a lever and to automatically discontinue such rotation and rising at the end of the cut.

Another object of the invention is to provide means for automatically tensioning the knife against the center bone structure of the piece of meat being sliced to thus eliminate the necessity for manual operation of the slicer.

A further object of the invention is to provide a structure in which the cut of meat will be rotated as the knife moves upwardly to thus provide a spiral cut continuously from one end to the other of the meat.

Other objects of this invention will appear in the following description and appended claims, reference being had to the accompanying drawings forming a part of this specification wherein like reference characters designate corresponding parts in the several view.

In the drawings:

FIGURE 4 is a top plan section view of the meat slicer taken substantially along the line 4—4 of FIGURE 1 looking in the direction of the arrows;

FIGURE 5 is an enlarged sectional view of a clutch mechanism, utilized in connection with the knife carriage, taken substantially along the line 5—5 of FIGURE 4 looking in the direction of the arrows;

FIGURE 6 is a sectional view of the clutch mechanism taken substantially along the line 6—6 of FIGURE 5 looking in the direction of the arrows;

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
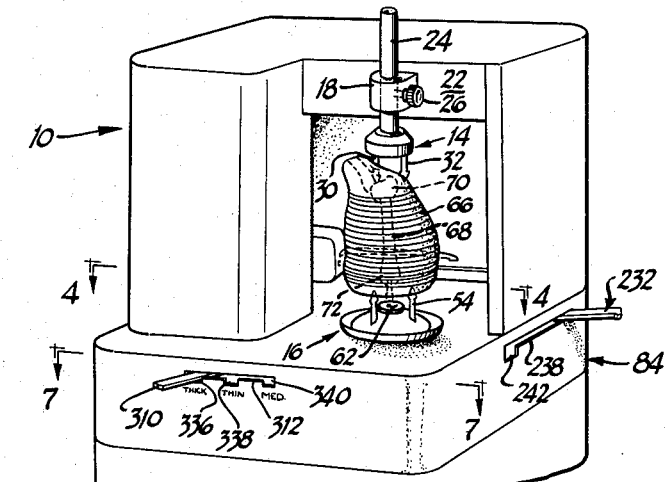
FIGURE 1 is a perspective view of one embodiment of the spiral meat slicer of the present invention.

As may be seen in FIGURE 1, the spiral meat slicer 10 is mounted on a support structure 12 which supports the slicing apparatus at a convenient working level. The slicing apparatus may be divided into the five following portions for convenience of description:

(1) Means for Mounting the Meat.
(2) Means for Rotating the Meat.
(3) Reciprocating Knife Structure.
(4) Means for Tensioning the Knife Blade Against the Meat.
(5) Means for Moving the Knife Structure Upwardly.

*Means for Mounting the Meat*

As may be seen in FIGURES 1, 9, 10 and 11, the means for mounting the meat include an upper axially adjustable support 14 and lower rotatably driven support 16. The upper support 14 comprises a bracket 18 having an opening therethrough. The bracket 18 is mounted on a structural member 22. Slidably received in the bracket 18 is an axially adjustable rod 24. The rod 24 is secured in adjusted positions by means of a set screw 26 threadingly received in the bracket 18.

Figure 10:
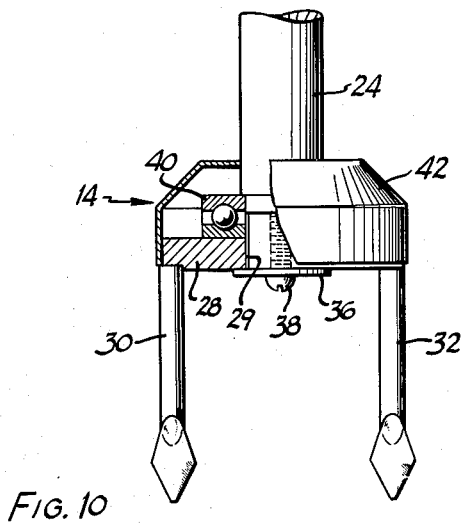
FIGURE 10 is an enlarged view partially in section of the upper meat supporting structure shown in FIGURE 1.

As may best be seen in FIGURE 10, a rotatable prong structure is provided on the lower end of the rod 24. The prong structure includes a disc 28 having a pair of prongs 30, 32 extending downwardly therefrom. The disc 28 has an opening 29 therethrough and is received on the lower reduced end of the rod 24. The disc is secured in place by means of a washer 36 and a screw 38. The disc 28 is rotatably journaled on bearing 40 to permit rotation thereof with respect to the rod 24. The upward force of the meat against prongs 30, 32 prevents the washer 36 binding against disc 28 during rotation. A cap 42 is provided to enclose the lower end of rod 24.

Figure 11:
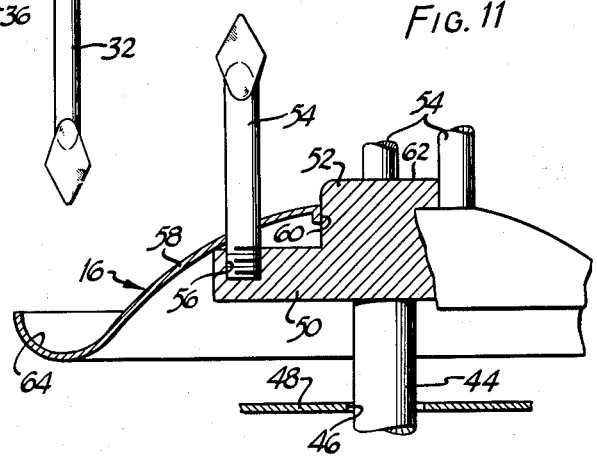
FIGURE 11 is an enlarged view partially in section of the lower meat supporting structure shown in FIGURE 1.

The lower rotatably driven support 16, as may best be seen in FIGURE 11, includes a power driven shaft 44 which extends upwardly through an opening 46 in casing wall 48. Carried on the upper end of the shaft 44 is a disc 50 having an upwardly projecting center portion 52 of reduced diameter. Three upwardly projecting circumferentially spaced prongs 54 are received in threaded openings 56 provided in the disc 50. A dish-shaped cover plate 58 is received on the prongs and has a center opening 60 received on the portion 52. This arrangement secures the plate 58 in place and provides a sturdy meat supporting surface 62 on the portion 52. A peripheral trough 64 is provided on the plate 58 to capture bits of meat or juices which extrude from the meat being sliced.

Referring to FIGURE 1, it may be seen that a cut of meat, shown as a ham 66, may be mounted between the upper and lower support members 14, 16. In mounting a ham, the butt end of the ham is inserted on the prongs 54 to a position where the lower end of the ham rests on the surface 62. The leg bone 68, having joints 70, 72, is positioned upright so that the bone 68 forms a substantially vertical axis of rotation for the ham. After the ham has been positioned on the lower support, the upper support is lowered to insert the prongs 30, 32 into the shank end of the ham. One of the prongs may be inserted directly into the joint 70. The set screw 26 is then tightened and the ham is in position for slicing.

Figure 2:
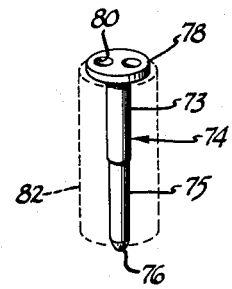
FIGURE 2 is a perspective view of a spit insertable into a cut of meat which does not have a bone.

When it is desired to slice a boneless meat product, the spit structure shown in FIGURE 2 may be utilized. The spit structure comprises a telescopic rod 74 including frictionally connected upper and lower sections 73, 75. The section 75 is pointed at its lower end 76. A disc 78 is provided on the upper end section 73. The disc has two openings 80 to receive the prongs 30, 32 of the upper support structure. In operation, the rod 74 is inserted into a boneless meat product 82, the rod is adjusted for length and the thus spitted meat is mounted on the slicer as described in the case of a ham.

Means for Rotating the Meat

Figure 7:
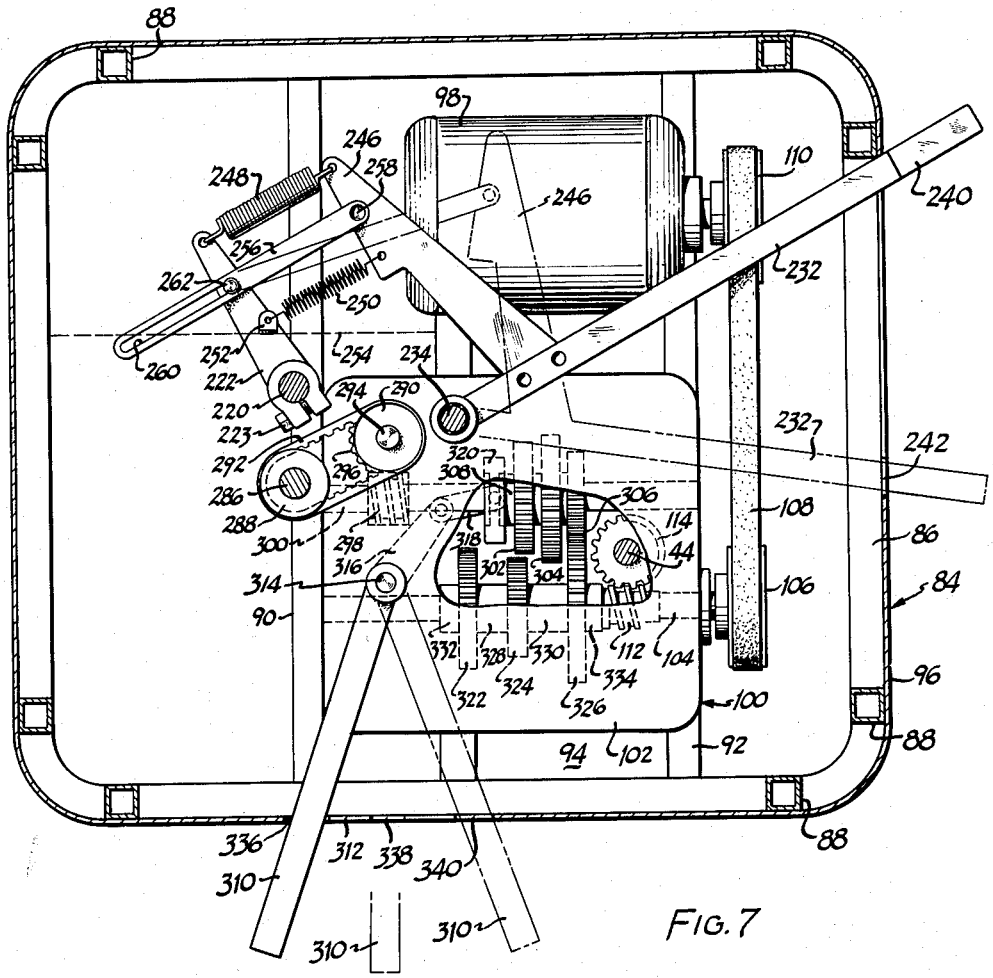
FIGURE 7 is a sectional plan view of the meat slicer taken substantially along the line 7—7 of FIGURE 1 looking in the direction of the arrows.

As previously mentioned, the lower support shaft 44 is power driven. The drive means for the shaft 44 are shown in FIGURE 7. The drive mechanism is mounted in a housing 84 which is supported directly on the slicer support structure 12. The housing 84 comprises a generally rectangular tubular lower support 86 having a plurality of upwardly extending spaced-apart support members 88. A second rectangular support member 89 (FIGURE 3) is secured to the upper ends of members 88. The lower support 86 has a pair of spaced apart transverse support tubes 90, 92 which carry therebetween a support platform 94. A sheet metal cover 96 is provided on the exterior of the housing 84.

Mounted on the platform 94 is an electric motor 98 and a transmission 100. The transmission 100 is provided to drive the slicer knife carriage at varying speeds as will be hereinafter described. The transmission 100 includes a housing 102 in which is rotatably journaled a horizontal shaft 104. The shaft 104 extends exteriorly of the housing 102 and has mounted on its exterior end a pulley wheel 106. The pulley 106 is connected by a belt 108 to a pulley 110 carried on the output shaft of the motor 98. Actuation of the motor 98 is consequently effective to rotate the transmission shaft 104.

The shaft 104 carries a worm 112. The worm 112 meshes with a worm gear 114 which is carried on the lower end of the support shaft 44 which extends into the transmission housing 102. Rotation of the shaft 104 is consequently effective to drive the shaft 44 resulting in rotation of the cut of meat mounted between the support structures 12, 14.

Reciprocating Knife Structure

Figure 3:
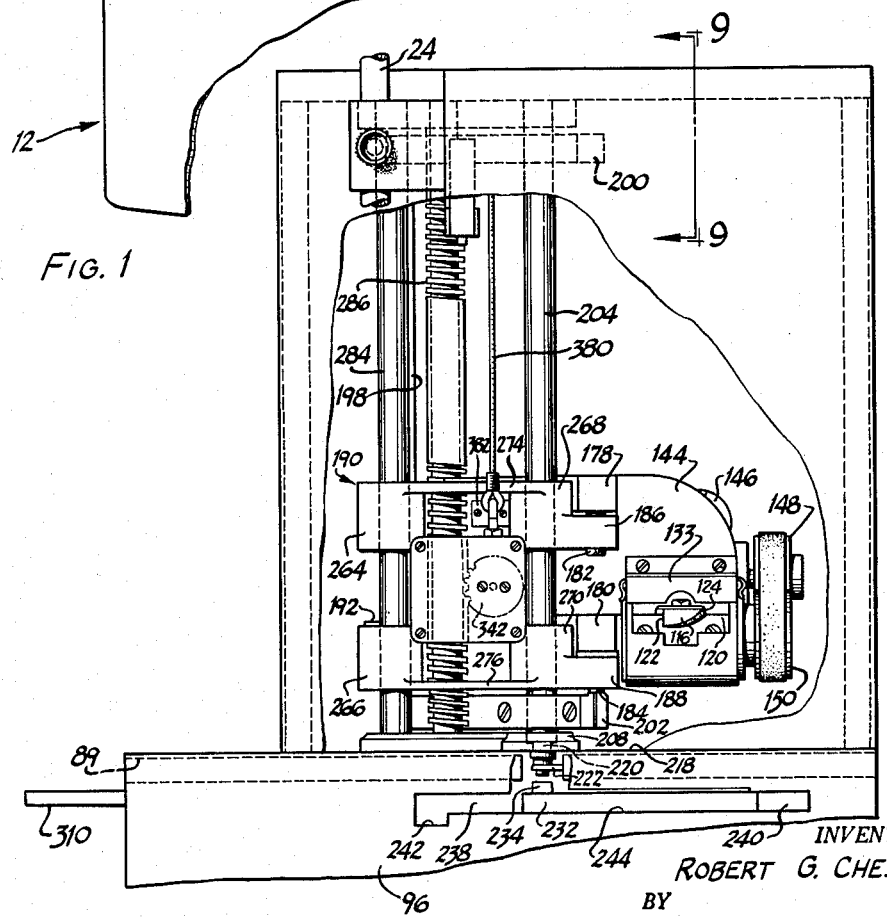
FIGURE 3 is a side elevational view of the spiral slicer of FIGURE 1 with parts broken away for the purpose of clarity.
Figure 8:
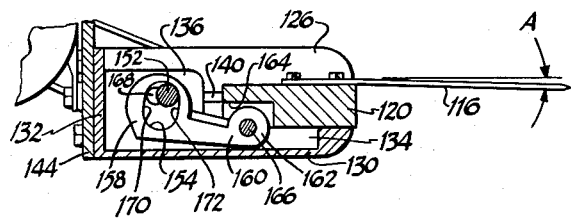
FIGURE 8 is a sectional view of the knife structure taken substantially along the line 8—8 of FIGURE 4 looking in the direction of the arrows.

The reciprocating knife structure is best seen in FIGURES 3, 4 and 8. This structure comprises a serrated knife blade 116 which is secured at one end by screws 118 to a movable support block 120. The free end of the blade 116 extends to a point beyond the vertical axis of the meat supporting members 14, 16. As will be noted in FIGURE 8 the blade 116 is angled at a slight downward angle A with respect to the horizontal plane. As will be seen in FIGURE 3, the blade is also tipped along its longitudinal axis whereby the cutting edge 122 is lower than the back edge 124. The purpose of this orientation is to permit the knife blade to follow the angle of the helix which it cuts on a piece of meat. In operation of the slicer, the blade will actually follow three different helixes to facilitate cutting slices of different thicknesses. Theoretically, the angle of the blade should be adjusted for each different helix. However, it has been found in practice that if the blade is positioned to correspond to the medium-thickness slice, it will perform satisfactorily when cutting thin and thick slices.

The block 120 is mounted for reciprocal movement in a bracket having side walls 126, 128, a bottom wall 130 and an end wall 132. In use, a snap-on guard cover 133 (FIGURE 3) is provided to completely enclose the bracket. The block 120 seats on ways 134. A pair of spaced apart oppositely disposed bearing blocks 136, 138 are provided adjacent the end wall 132. Each block 136, 138 carries an outwardly projecting guide pin 140, 142 each of which is slidably received in an opening provided in the block 120. The pins 140, 142 act to constrain the block 120 to the desired reciprocal movement.

The end wall 132 of the bracket is secured to one face of a vertically oriented plate 144. The plate 144 is pivotally mounted on a vertically movable carriage 190 as will hereinafter be more fully explained in connection with slicing of the meat. An electric motor 146 is mounted on the reverse side of the plate 144. The output shaft of the motor carries a pulley 148 which is drivingly connected to a pulley 150 mounted on shaft 152. The shaft 152 is rotatably mounted in bearing blocks 136, 138 and extends through an elongated opening 154 provided in a crank member 158. The crank member 158 is positioned between the bearing blocks 136, 138 and has an arm 160 which extends towards the block 120. As shown in FIGURE 8, the arm 160 terminates in an enlarged portion 162 which extends into a notch 164 provided in the block 120. The portion 162 is pivotally secured to the block 120 by pin 166.

The shaft 152 is provided with a cam portion 168 intermediate the ends thereof. The cam is positioned within the opening 154 of the crank member. Rotation of the shaft 152 will cause the cam 168 to alternately engage surfaces 170, 172 of the opening 154 and thus drive the crank member in a reciprocal motion. As will be appreciated, reciprocal motion of the block 120 will cause the knife blade 116 to reciprocate in a cutting action. The blade 116 will also tend to vibrate upon such reciprocation. This action prevents the blade from sticking to the meat which it is cutting.

Means for Tensioning the Knife Blade Against the Meat

The means for tensioning the knife blade against the meat can best be seen in FIGURES 3, 4, 7 and 9. As previously mentioned, the knife structure is mounted on pivotal plate 144. As will be noted in FIGURE 3, the plate 144 has upper and lower projections 178, 180 on one surface thereof intermediate the ends of the plate. Each projection 178, 180 has a downwardly extending pin 182, 184. The pins 182, 184 are received in openings provided in spaced projections 186, 188 provided on the vertically movable carriage 190. As will be appreciated, the plate 144 can consequently be pivoted about a vertical axis defined by the pins 182, 184.

As shown in FIGURE 4, the plate 144 has a forked arm 192 secured thereto by means of screws 194. The arm 192 has a slot 196 at its outer end which slidingly receives a vertical rod 198. The rod 198 is connected at its upper and lower ends to a pair of horizontally extending bars 200, 202. The bars 200, 202 are fixedly connected at their opposite ends to a vertical guide shaft 204. The guide shaft 204 is rotatably journaled in upper and lower bearings 206, 208. The upper bearing 206 (FIGURE 9) is secured to a bracket 210 which is carried on support member 212. The member 212 forms part of a supporting framework comprising upright structural members 214 and horizontal structural member 216. The lower bearing 208 (FIGURE 3) is supported on support surface 218. The guide shaft 204 has a reduced section 220 which extends downwardly through the bearing 208 into fixed engagement (FIGURE 7) by means of screw 223 with a pivotal arm 222.

A manually operable handle structure is provided to cause pivoting of the arm 222. The manual means include an arm 232 which is rotatably mounted on vertical rod 234, arm 232 being capable of slight up and down pivoting. The rod 234 extends upwardly as may best be seen in FIGURE 3. The arm 232 extends horizontally through an elongated horizontal opening 238 provided in the cover 96. The arm 232 terminates exteriorly of the slicer construction in a handle portion 240. The opening 238 includes a downwardly extending detent 242 at one end. The arm 232 normally bears downwardly against the edge 244 of the opening 238. When the arm is pivoted to a position over detent 242, it will fall into the detent thus locking the arm in this pivoted position.

The arm 232 is provided, adjacent its inner end, with an extension 246 (FIGURE 7) which projects outwardly therefrom at substantially right angles. The extension 246 is connected to the arm 222 by means of a spring 248 which extends between the outer ends of these members. A second spring 250 extends from the extension 246 into engagement with a bracket 252 which is secured to a fixed structural member indicated by the dotted line 254. An elongated member 256 is pivotally mounted by pin 258 to the extension 246. The member 256 has an elongated opening 260 extending longitudinally thereof adjacent the opposite end of the member. The opening 260 slidingly receives an upwardly projecting pin 262 provided on the arm 222.

In operation, the arm 232 is manually moved into engagement with the detent 242. This movement causes pivoting of the arm 222 via the member 256. Pivoting of arm 222 causes rotation of the guide shaft 204. Rotation of the guide shaft causes rotation of the rod 198 which is connected thereto by bars 200, 202. The rod 198, which is slidingly connected to forked arm 192, carries with it the plate 144 to thus pivot the knife blade 116 towards the cut of meat mounted in the slicer. These movements are shown in dotted lines in FIGURES 4 and 7.

Upon initial movement of the arm 232, the spring 248 will tend to stretch out rather than to move the relatively heavy structure associated with the knife blade 116. While the spring 248 would eventually cause movement of the structure, the heavy stress on spring 248 would cause rapid deterioration of the spring. The member 256 is thus provided to effectuate the initial movement of the structure associated with the knife blade. When the arm 232 is moved towards the detent 242, the spring 248 will stretch out until the outer end of opening 260 in member 256 engages the pin 262. A rigid connection will then be formed between the extension 246 and the arm 222 causing movement of the arm 222. After the arm 232 has been locked in detent 242, the spring 248 will cause further movement of the arm 222. Assuming an average diameter bone, the arm 222 will eventually come to rest with the pin 262 intermediate the ends of opening 260. This position permits the knife blade to move either inwardly or outwardly to the extent of the length of opening 260.

The spring connection of arm 222 with extension 246 permits the arm 222 to move when a force is applied thereto. Consequently, when the knife blade 116 contacts a thick portion of the bone in the meat, it can move outwardly away from the bone. When the bone thins down, the knife will move back towards the center of the cut of meat under the tension of spring 248. Thus, the knife will always cut right up to the bone and is able to cut meat having non-uniform diameter bones.

Upon release of the arm 232 from detent 242, the return spring 250 will cause the arm 232 to return to its initial position. When the arm 232 has moved a short distance, the inner end of the opening 260 and member 256 will contact pin 262 and thereafter, cause rotation of the mechanism associated with the knife blade.

*Means for Moving the Knife Structure Upwardly*

The means for moving the knife blade structure upwardly may best be seen in FIGURES 3, 4, 5, 6, 7 and 9. As previously mentioned, the plate 144 which carries the knife blade structure is mounted on vertically movable carriage 190. The carriage 190 may be conveniently fabricated as a casting. The carriage comprises a pair of upper and lower hollow cylindrical portions 264, 266, 268, 270 which are joined together by upper and lower horizontal walls 274, 276 and a back wall 278. This structure forms an open-type box-like structure with the mouth of the box facing in a horizontal direction. A pair of spaced apart horizontal walls 280, 282 are provided intermediate the upper and lower walls 274, 276.

The carriage 190 is mounted for sliding movement on spaced apart vertical guides 204, 284. The guides each extend through a pair of the cylindrical members 264, 266 and 268, 270.

Vertically registering openings are provided in each of the walls 274, 276, 280 and 282 to receive a vertical worm 286. The worm 286 is rotatably driven by the motor 98 through the transmission 100. As may best be seen in FIGURE 7, the lower end of the worm carries a pulley 288. The pulley 288 is connected to a pulley 290 by means of a belt 292. Pulley 290 is mounted on a shaft 294 which extends into the transmission housing 102. A worm gear 296 is carried on the inner end of shaft 294 and meshes with a worm 298. The worm 298 is carried on horizontal shaft 300 which is journaled in the transmission housing 102.

The shaft 300 is splined to receive an internally splined cylindrical member 308. Mounted on the cylinder 308 are gears 302, 304, 306. The gears are of different diameters, the center gear 304 having the largest diameter. The gears are movable axially by manual actuation of arm 310. The arm 310 extends from a point outside the slicer through an elongated horizontal opening 312 in the cover 96 to fixedly engage shaft 314 which extends into the transmission housing. A link 316 is fixedly mounted on the inner end of shaft 314 and extends into pivotal engagement with a second link 318. The link 318 is pivotally attached at its opposite end to member 320 forming part of the cylinder 308. As will be appreciated, manual actuation of the arm 310 will cause axial movement of the member 308 to thus move the gears 302, 304, 306 axially.

Mating gears 322, 324, 326 are provided on transmission shaft 104. These gears are spaced apart by spacer members 328, 330 and the assembly is held in place by the collars 332, 334. The gears 322, 324, 326 are also of different diameters, the smallest diameter gear being the center gear 324. The gears 302, 304, 306 may be shifted to any one of three different positions. In each position, a gear on shaft 300 will mesh with one of the gears on shaft 104. The varying diameters of the gears provide for different gear ratios with resultant different speeds of rotation of the shaft 300. The arm 310 may be locked in any one of the three different positions by means of the detents 336, 338, 340 provided in the opening 312. As viewed in FIGURE 7, the detent 336 provides for thick cuts of meat, the detent 338 provides for thin cuts and the detent 340 provides for medium cuts.

The worm 286 when rotated via the transmission 100, is effective to raise the carriage 190. A worm gear 342 is provided on the carriage to engage the worm. The worm gear has an associated clutch mechanism whereby to engage the worm only during periods when it is desired to raise the carriage. The gear 342 is rotatably mounted on shaft 344. The shaft 344 is fixedly secured within opening 346 provided in projection 348 forming a portion of the back wall 278 of the carriage. When the gear 342 is permitted to rotate freely, the carriage will not be moved upwardly. The clutch mechanism is provided to prevent rotation of gear 342 when it is desired to move the carriage upwardly.

The clutch comprises a support plate 350 which is detachably mounted by screws 352 on the intermediate carriage walls 280, 282. The inner face of the plate 350 carries a pair of substantially semi-circular members 354, 356 which are spaced apart to provide a slot therebetween. Each member 354, 356 is provided with a groove 358 to define a circular opening therebetween. A spring 360 is provided in the opening formed by the grooves and impinges against an elongated bar 362. The bar 362 carries a plunger 364 which extends through an axial opening in shaft 344 to terminate exteriorly of the carriage wall 278.

An annular flange 366 is provided on one face of gear 342. The flange is provided with spaced apart slots 368. Each pair of diametrically opposed slots 368 forms a detent to receive the bar 362. The bar 362, which is fixed against rotation by the members 354, 356, will thus lock the gear 342 against rotation when it engages a pair of slots 368.

As will be noted, the outer end of the plunger 364 engages the plate 144 when the plate is in a non-slicing position. In this position, the plate moves the plunger 364 and bar 362 to disengage the gear 342. Pivoting of the plate 144 away from the plunger 364 permits the bar 362 under the action of spring 360 to engage the gear 342 to thus effectuate upward movement of the carriage 190 upon rotation of the screw. Thus, when the knife has been shifted to a cutting position by the arm 232, the carriage will be moved upwardly. When the arm 232 is released, and the knife and associated structure returned to its initial starting position, the gear 342 will be disengaged and upward movement of the knife will cease.

A switch 370 is provided on carriage wall 278 to energize the motor 98 when the knife has been moved into cutting position. The switch 370 has a spring-loaded depressible plunger 372 which extends through an opening 374 in wall 278 to contact the plate 144 similarly to the clutch plunger. In the position shown in FIGURE 5, the plate 144 has depressed plunger 372, thus opening switch 370 and de-energizing the motor 98.

A limit switch 376 (FIGURE 9) is provided adjacent the upper end of the screw 286 in the path of carriage 190. The switch 376 has a spring-loaded depressible plunger 378 which abuts against the upper wall 274 of the carriage when the carriage has risen the maximum desirable distance. The switch 376 is also operative to de-energize the motor 98 to thus prevent damage to the slicer which would be occasioned by undercontrolled rising of the carriage.

After the cut of meat has been completely sliced, the arm 232 is released from detent 242. The knife blade and associated structure, including the plate 144 will then be pivoted back to the initial position as has been previously described. When this occurs, the plate 144 will depress clutch plunger 364 thus freeing the gear 342 for rotation. The weight of the carriage 190 will cause the carriage to slide down guides 204, 284 to the initial starting position.

Figure 9:
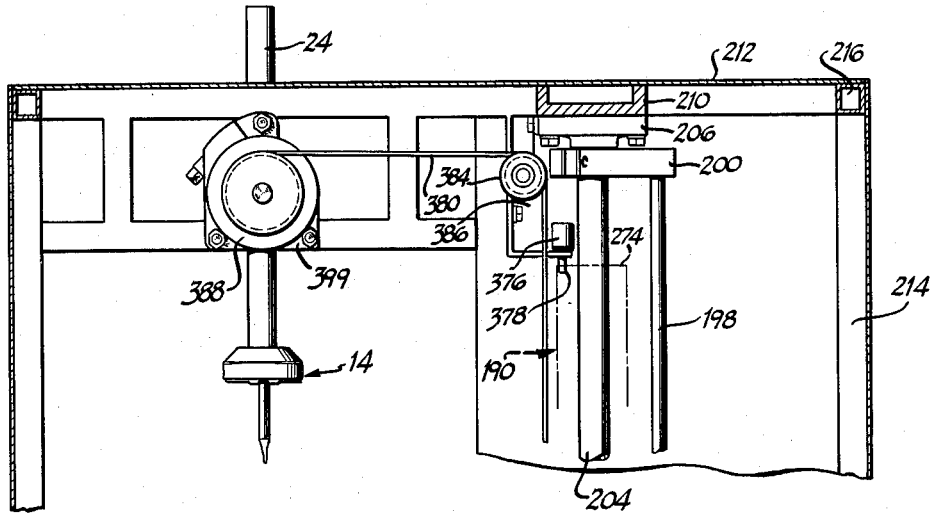
FIGURE 9 is a rear elevational view of the upper section of the meat slicer of FIGURE 1 with portions of the cabinet removed for the purpose of clarity.

Downward movement of the carriage is restrained by means of a counter balance system. As will be noted in FIGURE 3, a cable 380 is attached at one end to a bracket 382 which is secured to the carriage 190. The cable extends upwardly, and as shown in FIGURE 9, is wrapped around a pulley 384 which is secured to structural member 386. The cable extends horizontally from the pulley 384 into engagement with a spring loaded counterbalance pulley 388 rotatably mounted on bracket 399. As the carriage 190 rises, the cable 380 is wound on pulley 388. When the carriage is released for downward movement, the cable unwinds from the pulley, thus rotating this member and causing the spring (not shown) positioned therein to be wound up. The winding of the spring acts as a counterforce to downward movement of the carriage and thus slows down the carriage movement.

In operation of the meat slicer, the meat is first positioned in the slicer and the knife 116 is moved into cutting engagement therewith. Such movement of the knife blade causes the motor 98 to be energized and rotate the meat and causes the carriage to rise carrying with it the knife 116. Rotation of the meat and upward movement of the knife blade results in a spiral cut as shown in FIGURE 1. The thickness of the cut may be varied, as previously described, by varying the speed of rise of the carriage via the transmission 100. The faster the rise, the thicker the cut. At the conclusion of the cut, the knife blade is moved away from the meat and dropped back to its initial position. The meat may then be removed from the slicer and packaged for eventual consumption.

Having thus described my invention, I claim:

1. A spiral meat slicer for forming a continuous spiral slice on a cut of meat having a bone extending therein comprising means for mounting the meat upon the bone as a substantially vertical axis about which to rotate the meat; a vertically movable carriage; a knife for slicing the meat mounted on said carriage; said knife being positioned at an angle other than 90° with respect to the axis of rotation of the bone to enable a spiral cut to be made in the meat; means for longitudinally reciprocating the knife against the meat; means for automatically tensioning said knife against the meat; means for rotating the meat; and means for simultaneously moving said carriage vertically to advance the knife along the axis of rotation of the meat to form a continuous spiral slice in the meat; said last-mentioned means comprising a substantially vertical power driven worm; a freely rotatable worm gear on said carriage in engagement with the worm; and a clutch on the carriage to selectively engage the worm gear and prevent rotation thereof whereby rotation of the worm is effective to move the carriage upwardly; disengagement of said clutch being effective to release said worm gear from rotation and permit gravity descent of said carriage.

2. A device as claimed in claim 1 and further characterized in the provision of counterbalance means to regulate the rate of descent of the carriage upon disengagement of the clutch.

3. A device as claimed in claim 1 and further characterized in the provision of an electric motor to rotate said worm; a manually operable transmission interconnecting said motor with said worm; said transmission including means to selectively vary the speed of rotation of the worm to thereby vary the rate of ascent of the carriage whereby to vary the thickness of the slice in the meat.

4. A device as claimed in claim 1 and further characterized in the provision of a limit switch having a depressible plunger positioned above said carriage; said carriage abutting against and depressing the limit switch plunger at the peak of upward carriage movement; depression of said plunger being operative to open the limit switch and de-energize said electric motor to prevent further rise of the carriage.

5. A spiral meat slicer for forming a continuous spiral slice on a cut of meat having a bone extending therein comprising means for mounting the meat upon the bone as a substantially vertical axis about which to rotate the meat; a vertically movable carriage; a horizontally pivotable support structure pivotably mounted on said carriage; a knife for slicing the meat mounted on said support structure; said knife being positioned at an angle other than 90° with respect to the axis of rotation of the bone to enable a spiral cut to be made in the meat; means for longitudinally reciprocating the knife against the meat; lever means for moving the knife into slicing engagement with the meat; resilient means interconnecting said lever means with said support structure to yieldingly maintain the knife in contact with the meat bone; means for rotating the meat; and means for simultaneously moving said carriage vertically to advance the knife along the axis of rotation of the meat to form a continuous spiral slice in the meat.

6. A device as claimed in claim 5 and further characterized in the provision of means to releasably lock the knife in meat engaging position; and second resilient means operative upon release of the knife to move the knife out of engagement with the meat.

7. A device as claimed in claim 5 and further characterized in the provision of an elongated member having a pointed end for insertion into a boneless meat product to provide a bone structure therefor; said elongated element comprising a pair of telescopic elements movable relative to one another to vary the length of the elongated member to accommodate different sized cuts of meat.

8. A spiral meat slicer for forming a continuous spiral slice on a cut of meat having a bone extending therein comprising means for mounting the meat upon the bone as a substantially vertical axis about which to rotate the meat; a vertically movable carriage; a horizontally pivotable support structure pivotally mounted on said carriage; an electric motor carried on said support structure; a knife supporting member mounted for reciprocation on said support structure; a crank mechanism interconnecting said motor with said knife supporting member for reciprocation of the knife supporting member; an elongated knife having one end secured to the knife supporting member; said knife being positioned at an angle other than 90° with respect to the axis of rotation of the bone to enable a spiral cut to be made in the meat; lever means for moving the knife into slicing engagement with the meat; resilient means interconnecting said lever means with said support structure to yieldingly maintain the knife in contact with the meat bone; means for rotating the meat; and means for simultaneously moving said carriage vertically to advance the knife along the axis of rotation of the meat to form a continuous spiral slice in the meat.

9. A spiral meat slicer for forming a continuous spiral slice on a cut of meat having a bone extending therein comprising means for mounting the meat upon the bone as an axis about which to rotate the meat; a knife for slicing the meat; said knife being positioned at an angle other than 90° with respect to the axis of rotation of the bone to enable a spiral cut to be made in the meat; means for longitudinally reciprocating the knife against the meat; means for rotating the meat; means for simultaneously advancing the knife along the axis of rotation to form a continuous spiral slice in the meat; and a transmission for varying one of the speed of rotation of the meat and the speed of advancing of the knife to thereby permit cutting slices of different thicknesses.

10. A spiral meat slicer for forming a continuous spiral slice on a cut of meat having a bone extending therein comprising means for mounting the meat upon the bone as an axis about which to rotate the meat; a knife for slicing the meat; said knife being anchored at one end and extending from the periphery of the meat to a point slightly beyond the axis of rotation of the bone; said knife being positioned at an angle other than 90° with respect to the axis of rotation of the bone to enable a spiral cut to be made in the meat; means for longitudinally reciprocating the knife against the meat; means for rotating the meat; and means for simultaneously advancing the knife along the axis of rotation to form a continuous spiral slice in the meat.

11. A meat slicer as defined in claim 10 and further characterized in that the means for simultaneously advancing the knife also advance the means for longitudinally reciprocating the knife therewith.

References Cited in the file of this patent
UNITED STATES PATENTS

| | | |
|---|---|---|
| 836,140 | Radsch | Nov. 20, 1906 |
| 1,256,751 | Wenzel | Feb. 19, 1918 |
| 1,503,390 | Tenney | July 29, 1924 |
| 2,344,928 | Wheeler | Mar. 21, 1944 |
| 2,599,328 | Hoenselaar | June 3, 1952 |